Patented Oct. 20, 1942

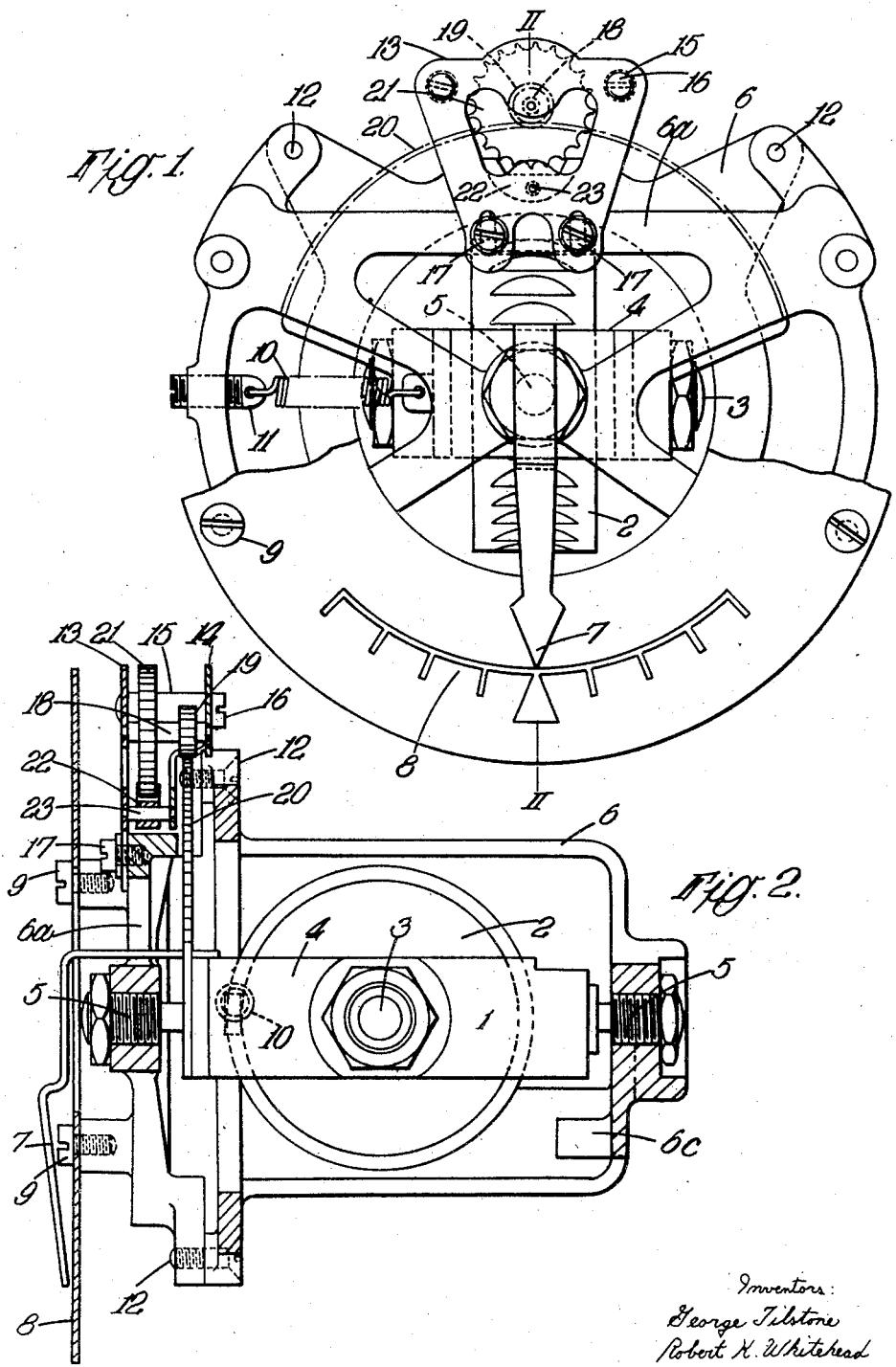

2,299,663

UNITED STATES PATENT OFFICE 2,299,663

GYROSCOPIC INSTRUMENT

George Tilstone and Robert Kenneth Whitehead, Stafford, England, assignors to The English Electric Company Limited, London, England, a British company Application February 7, 1941, Serial No. 377,940
In Great Britain March 13, 1940

6 Claims. (Cl. 33—204)

This invention relates to the damping of a gyroscopic instrument movement and although of general application is particularly suited to such an instrument for indicating turning movements of vehicles or aircraft. An instrument of this kind usually comprises a cradle or gimbal ring pivoted about one axis and carrying a flywheel rotating about a substantially perpendicular axis; any precessional movement of the flywheel and cradle in response to turning movement of the vehicle actuates an indicating member such as a pointer. For the purpose of damping out oscillations of the cradle when precessional movement is set up, the cradle has hitherto usually been connected to an air dashpot.

It is a disadvantage of an air dashpot that the friction between the piston and cylinder is high, even when the dashpot is new, and increases in service due to wear or corrosion, both being liable to be considerable owing to the difficulty of keeping grit and moisture out of the dashpot. When operating at low temperatures, freezing of moisture which has entered the dashpot is liable to cause the device to seize up. It is the aim of the present invention to provide a damping device in which the friction between the parts is relatively low and remains substantially constant in service and which is substantially unaffected by the action of grit or moisture in the atmosphere or by climatic conditions, while being relatively cheap and simple to manufacture.

According to the present invention, movement of the cradle is retarded by an escapement in operative connection therewith whereby the cradle is prevented from overshooting the mark and swinging back again and so the setting up of unwanted oscillations is substantially prevented.

One particular form of the invention as applied to a gyroscopic turn indicator for vehicles or aircraft is shown in the accompanying drawing of which Fig. 1 is a front view of the instrument with the dial partly broken away to reveal the mechanism, while Fig. 2 is a sectional elevation on the line II—II of Fig. 1.

In Figs. 1 and 2 the gyroscopic instrument movement 1 comprises a massive flywheel 2 forming the rotor of the instrument and pivotally mounted by bearings 3 on a cradle 4 which is in turn delicately pivotally mounted by bearings 5 about an axis perpendicular to the rotor axis to permit of precession of the rotor. The latter is constructed as a turbine rotor so that the instrument can be operated by air impinging on the flywheel periphery. The bearings 5 are supported by a chassis 6. The instrument movement 1 carries a deflection indicator in the form of a strip 7 attached to and projecting from the cradle 4, the end of the strip being bent to form a pointer. The part of the chassis carrying the front bearing need not be formed integrally with the part carrying the rear bearing but is shown as a bridge member 6a separate from but attached by screws 12 to the rear portion to form the complete chassis. The part 6a which thus lies in front of the instrument movement includes frontwardly projecting bosses to which the graduated dial 8 over which the pointer 7 moves is attached by screws 9. A coiled tension spring 10 having one end hooked on to the screw eye 11 carried by the chassis and the other end hooked on to a part of the cradle 4 serves to bias the movement 1 to a mid-position in opposition to the gyroscopic couple. A stop 6c projecting from the rear of the chassis limits the angular movement of the cradle 4.

For the purpose of damping out oscillations of the cradle when precessional movement is set up, the cradle has hitherto usually been connected to an air dashpot in instruments of this kind. According to the present invention the movement of the cradle is retarded by an escapement driven thereby. This escapement is supported in a frame made up of the front plate 13, the back plate 14, the spacing tubes 15 and the screws 16 passing through the back plate and the tubes into the front plate. The frame is attached to the front part 6a of the chassis by screws 17 passing through holes—slotted to permit of adjustment—in lugs formed integrally with the front plate 13. Journalled in the front and rear plates 13 and 14 is the spindle 18 to which is secured a pinion 19 in engagement with a wheel 20 secured to the cradle 4. Since the total movement of the latter is considerably less than one revolution, the circumference of the wheel 20 can be incomplete and of sector form. The wheel 20 and pinion 19 need not be toothed but the former can drive the latter by friction. Also secured to the spindle 18 and thus turning with the pinion 19 is the escape wheel 21 which is engaged by the pallet member 22 mounted on a second spindle 23 also journalled in the front and rear plates 13 and 14 of the frame.

On any precessional motion of the instrument movement 1 the wheel 20 on the cradle 4 drives the pinion 19 and so drives the escape wheel 21 which oscillates the pallet member 22. The effort required to move the pallet member is made comparatively small so that the instrument is sensitive to a small gyroscopic couple but the pallet member is given sufficient inertia to restrict its rate of oscillation to such an extent as to prevent unduly rapid swinging movement of the cradle.

The radius of the wheel 20 is shown as considerably greater than that of the pinion 19 so that the wheel and pinion form step-up gearing between the cradle and the escape wheel 21 whereby the latter is geared to the instrument movement so as to turn through a larger angle than the cradle 4. The escape wheel 21 may turn through more than 360°.

What we claim as our invention and desire to secure by Letters Patent is:

1. A gyroscopic instrument comprising a flywheel, a cradle in which the wheel is pivotally mounted, a chassis pivotally supporting the cradle for pivotal movement about an axis perpendicular to the pivotal axis of the flywheel, and retarding and damping means for the cradle comprising a driving wheel carried thereby, a pinion, an escape wheel turning with the pinion, a pivoted pallet member engaging the escape wheel and a bearing frame for the whole escapement so located that the said pinion is in driving engagement with the said driving wheel.

2. A gyroscopic indicating instrument comprising in combination a flywheel, a cradle in which the wheel is pivotally mounted, a chassis pivotally supporting the cradle for movement about an axis perpendicular to the pivotal axis of the flywheel, a spring biassing the cradle to a mid position and retarding and dampening means for the cradle in the form of an escape wheel in driving relationship with the cradle, and a pallet member engaging the escape wheel.

3. A gyroscopic indicating instrument comprising in combination a flywheel, a cradle in which the wheel is pivotally mounted, a supporting chassis on which the cradle is pivotally mounted perpendicularly to the pivotal axis of the flywheel, a spring biassing the cradle to a mid position and means for retarding the precessional movement of the cradle comprising a driving wheel carried thereby, a pinion, an escape wheel turning with the pinion, a pivoted pallet member engaging the escape wheel and a bearing frame for the whole escapement so located that the said pinion is in driving engagement with the said driving wheel.

4. A gyroscopic indicating instrument comprising in combination a flywheel, a cradle in which the wheel is pivotally mounted, a chassis pivotally supporting the cradle for movement about an axis perpendicular to the pivotal axis of the flywheel, and retarding and damping means for the cradle in the form of an escape wheel in driving relationship with the cradle and a pallet member engaging the escape wheel.

5. A gyroscopic indicating instrument comprising a chassis, a cradle pivotally mounted in said chassis, a flywheel pivotally mounted on said cradle for rotation about an axis transverse to the pivotal axis of said cradle, and means for retarding the pivotal movement of the cradle comprising a driving wheel carried by and concentric with the pivotal axis of said cradle, in combination with escapement means carried by said chassis in operative engagement with said driving wheel, the same including an escapement frame carried by said chassis, a pinion mounted on said frame for operative engagement with said driving wheel, an escape wheel mounted for rotation with said pinion, and a pallet pivotally mounted on said frame in operative engagement with said escape wheel.

6. A gyroscopic indicating instrument comprising a chassis, a cradle pivotally mounted in said chassis, a flywheel pivotally mounted on said cradle for rotation about an axis transverse to the pivotal axis of said cradle, and means for retarding the pivotal movement of the cradle comprising a driving wheel carried by and concentric with the pivotal axis of said cradle, in combination with escapment means carried by said chassis in operative engagement with said driving wheel.

GEORGE TILSTONE.
ROBERT KENNETH WHITEHEAD.